(No Model.)
H. BLUMENBERG, Jr.
ELECTROLYSIS.
No. 536,848.  Patented Apr. 2, 1895.
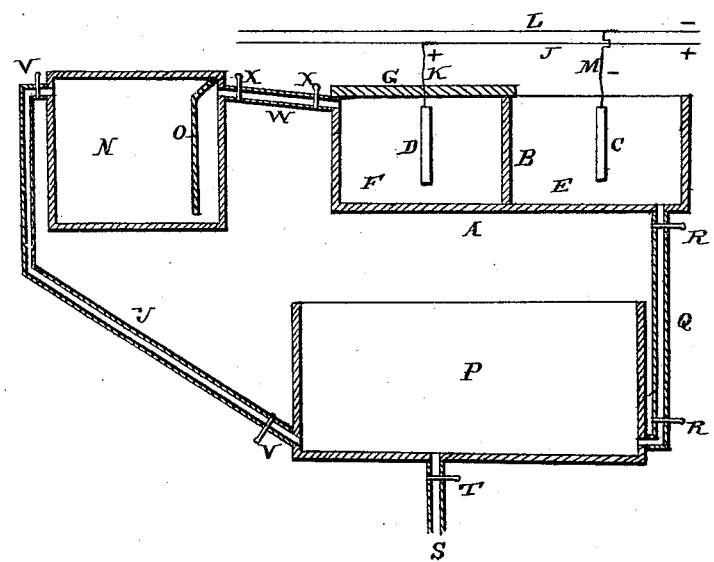
Witnesses
Geo. L. Clark
Leroy J. McNeely
Inventor
Henry Blumenberg Jr.
by Fenelon B. Brock
Attorney

UNITED STATES PATENT OFFICE.

HENRY BLUMENBERG, JR., OF MOUNT VERNON, NEW YORK.

ELECTROLYSIS.

SPECIFICATION forming part of Letters Patent No. 536,848, dated April 2, 1895.

Application filed October 9, 1893. Serial No. 487,582. (No specimens.)

*To all whom it may concern:*

Be it known that I, HENRY BLUMENBERG, Jr., a citizen of the United States, residing at Mount Vernon, in the county of Westchester, State of New York, have invented certain new and useful Improvements in Electrolysis; and I do declare the following to be a full, clear, and exact description of the invention, such as will enable others skilled in the art to which it appertains to make and use the same, reference being made to the letters of reference marked on the accompanying drawing, which forms a part of this specification.

My invention has for its object the obtainance of bromotes and chlorates, by electrolytic action, from the alkaline metals and the metals of the alkaline earths, from their respective bromides and chlorides.

For the purpose of carrying my invention into practice I first prepare an aqueous solution containing a bromide or chloride from which the bromate or chlorate desired is to be produced. The vat which I usually employ for this purpose is divided into two compartments by a porous partition. The opposite wires of an electric battery are led to the electrodes within the compartments of the vat, and the circuit is closed through the aqueous solution therein. The bases are set free in the electro-negative compartment, and the halogen in the electro-positive compartment.

The drawing represents, in diagrammatic view, an exemplification of my process.

A represents the vat.

B is the porous partition dividing the vat into the usual positive and negative compartments.

C is the negative electrode—such as cobalt, platinum, iron, carbon, nickel, or other suitable material.

D is the positive electrode—preferably platinum.

E is the positive, and F, the negative compartment. The former compartment E is covered by a top G fitting air tight thereon. The upper portion of compartment E contains halogen or acid radicals set free during electrolysis. Compartment F contains the electro-negative caustic solution, or basic radicals.

The positive wire J has a branch K leading to electrode D, and the negative wire L has a branch M leading to the electrode C—all from any suitable battery.

The gas-holder N contains acid radicals or halogens, like chlorine or bromine, and the temperature of this tank is preferably kept a little above the surrounding atmosphere.

O is a deflecting apron for the purpose of forcing the discharge into the bottom of the gas-holder before it is fed again to the vat A.

P is the tank in which is made the product—such as bromates or chlorates.

Q is a pipe connecting the negative compartment F with the tank P, having a valve R at each end.

S is a pipe having a valve T for carrying off the water impurities and by-products.

U is a pipe leading from tank P to gas-holder N and provided with valves V.

W is a pipe connecting gas-holder N with positive compartment E, and having valves X. An electrolyte, in a solution of water, having, say potassic chloride, is then put in the vat and electrolyzed. The halogen or acid radical chlorine goes to the electro-positive, and the potash to the electro-negative compartment, decomposing the water there and forming caustic potash. This halogen is led off through pipe W into gas-holder N. The caustic solution is led from the electro-negative compartment F through pipe Q into the tank P, where it awaits the chlorine or halogen which comes from the gas-holder N through the pipe U. The product is produced in this tank, and the by-product is led off through pipe S, and can be used over again. The voltage should be high enough only to overcome the affinities of the halogen for the base.

The by-product varies according to the original substance put into the vat. If chloride of potassium be the material to produce the desired chlorate the by-product is then chloride of potassium, caustic potash, chloride gas, a little chlorate of potash, and a percentage of the original impurities which the original chloride of potassium contained before putting the same into the vat.

I prefer to have the bath at a temperature of 120° Fahrenheit in order that the hypochlorite formed will be resolved into chlorate and chloride of potassium.

The air-tight top G on top of the positive compartment serves to confine the evolved gases, consequently generating pressure therein. The difference in the pressure between the electro-positive division and the electro-negative division helps to reduce the resistance to a large extent, of the diaphragms separating the two, and therefore reduces the cost of running the process. The confining of the halogen under pressure keeps that gas also from penetrating the surrounding atmosphere, as the gas is very poisonous. The pressure generated in the electro-positive division by the liberated chlorine gas also has a tendency to help keep asunder the products of the electrolysis with less electrical power than when the same is not under pressure. The pressure generated in the electro-positive divisions keeps asunder or helps the separation of the electrolyte, so that while the electric current is traversing the vat the splitting up of the electrolyte occurs in the center of the porous diaphragm. The moment the molecules of potassium chloride are decomposed the potassium and chlorine assume a sort of polarized equilibrium, either one, in their nascent atomic state, not knowing what to do, whether to recombine or to go to their respective poles. While in this state, the electric current carries them along to their respective divisions. Now as the electro positive division is under pressure from the liberated chlorine gas it forces the separated ions of potassium into the electro-negative division by the above pressure. This prevents this state of polarization at the moment of the disassociation of the chloride of potassium in the center of the porous diaphragm, and therefore helps to keep asunder the products formed by the electric current, and also helps to produce in a given time a larger quantity of the desired product for the same unit of electric energy. For the chlorine, the moment it is liberated from the chloride of potassium it assumes a gaseous form, and finds itself in the upper part of the electro-positive division, which is air-tight, and therefore causes the above-named results. It must be distinctly understood that this pressure in itself does not cause the separation of the electrolyte but only helps the electric current. It is a sort of secondary action and separates only in co-operation with the electric current. The resistance of the porous diaphragm is reduced because the electrolyte in the vat is under an unequal pressure and the electrolyte in the electro-positive division is forced through the porous diaphragm as a sort of a filter. Therefore the porous diaphragm, under pressure from the electrolyte contains more conducting liquid and the resistance is thereby reduced as above, and the electrolyte is forced through the porous diaphragm just like a liquid is forced through a pressure filter.

I claim—

The herein described process, which consists in placing an electrolyte containing a haloid salt in a vat, electrolysing the same setting free the halogen, under pressure, at the positive electrode and the base without pressure at the negative electrode, conveying the halogen to a closed gas-holder or accumulator, under pressure, conveying the base into a tank, and tapping the halogen in the gas-holder, when desired, and conveying the same to said tank where the product is formed.

In testimony whereof I affix my signature in presence of two witnesses.

H. BLUMENBERG, JR.

Witnesses:
ALBERT C. SEIBOLD,
C. F. BRITTON.